United States Patent [19]
Jackson

[11] Patent Number: 5,271,315
[45] Date of Patent: Dec. 21, 1993

[54] PRESSURE BALANCED PISTON RINGS

[76] Inventor: Francis W. Jackson, 110 Summit Ave., Hatboro, Pa. 19040

[21] Appl. No.: 946,558

[22] Filed: Sep. 18, 1992

Related U.S. Application Data

[63] Continuation-in-part of Ser. No. 685,431, Apr. 15, 1991, abandoned, which is a continuation-in-part of Ser. No. 649,983, Feb. 4, 1991, abandoned.

[51] Int. Cl.⁵ .............................. F16J 9/00; F02F 5/00
[52] U.S. Cl. ........................................ 92/200; 277/170; 277/149
[58] Field of Search ............... 123/193.4; 92/194, 198, 92/200; 277/170, 173–176, 138, 149

[56] References Cited

U.S. PATENT DOCUMENTS

| | | | |
|---|---|---|---|
| 1,877,106 | 9/1932 | Williams | 92/200 |
| 1,938,826 | 12/1933 | Frank | 277/149 |
| 2,083,237 | 6/1937 | Norton | 277/149 |
| 2,466,253 | 4/1949 | McFall | 277/149 |
| 2,802,709 | 8/1957 | Heinze | 277/149 |
| 3,190,662 | 6/1965 | Mayfield | 277/149 |
| 3,377,075 | 4/1968 | Feller | 277/149 |
| 3,554,564 | 1/1971 | Lassanske | 277/170 |
| 3,554,568 | 1/1971 | Heid, Jr. | 277/170 |
| 3,727,927 | 4/1973 | Packard | 277/170 |
| 3,834,719 | 9/1974 | Shin et al. | 277/170 |
| 3,967,829 | 7/1976 | Rogers | 277/149 |
| 3,980,310 | 9/1976 | Packard et al. | 277/170 |
| 4,103,594 | 8/1978 | Geffroy | 277/170 |
| 4,158,328 | 6/1979 | Beardmore | 123/193.4 |
| 4,198,063 | 4/1980 | Shimizu et al. | 277/170 |
| 4,346,685 | 8/1982 | Fujikawa | 277/170 |
| 4,986,168 | 1/1991 | Geffroy et al. | 02/194 |
| 5,016,524 | 5/1991 | Kawai et al. | 277/176 |
| 5,133,563 | 7/1992 | Casellato | 277/173 |

Primary Examiner—Willis R. Wolfe
Assistant Examiner—Thomas Moulis

[57] ABSTRACT

Force balanced (or nearly balanced) rings to eliminate (or greatly reduce) pressure caused force build up of the ring(s) against the cylinder wall. Especially important in high pressure engines and/or where increased depth ring/cylinder contact surface is used.

6 Claims, 2 Drawing Sheets

PRESSURE BALANCED PISTON RINGS

This is a continuation-in-part application to application Ser. No. 07/685,431, filed Apr. 15, 1991, now abandoned, which is a continuation-in-part application to application Ser. No. 07/649,983, filed Feb. 4, 1991, now abandoned.

BRIEF DESCRIPTION OF DRAWINGS

FIG. 1 shows a ring design with extended sealing surface which pressure force or partially pressure force balances the gas pressure caused radial forces on the ring. Increased sealing surface depth becomes more viable with gas pressure caused radial ring force balancing to negate or reduce the impact of gas pressure caused ring forces on the cylinder wall. Circular Ring 100 in IC engine reciprocating piston 101 slides along cylinder wall 102 while sealing on surfaces 103 and 104. Passage 105 leads toward the pressure chamber while passage 106 leads toward the crankcase. Ring surfaces 107 & 108 are pressurized from passage 105 while surface 109 is pressurized from passage 106. Surface 103 & 104 are the sealing surfaces which with viscous flow should have approximately linear gas pressure drop across the sealing surface. The gas pressure forces exerted on the sealing surfaces 103 & 104 equate to about the mean of the pressures of passages 105 & 106 applied to the respective sealing surface area.

By dimensioning the ring to have the plane through the mid-pressure point of sealing surface 104 at the same level as the plane through the mid-pressure point of sealing surface of 103 the ring is in gas caused force balance with regard to the cylinder wall.

To provide for some increase in ring force on the cylinder wall with increased cylinder pressure, the plane through the mid-pressure point of sealing surface 104 should be below (closer to the passage 106) the plane through the mid-pressure point of sealing surface of 103. The gas pressure caused ring force build up increase against the cylinder wall can be selected (controlled) by the selection of this dimension (separation of the two planes) of the ring. Note surface 104 supports the axial ring downward force created by the pressure above the ring being above the pressure below the ring and surface 104 is at or about perpendicular to the cylinder wall thereby counteracting the gas pressure created axial force on the ring without creating a serious radial force component. Some slight taper of surfaces 104 and 110 may also be used to cause a small change in radial force with pressure, if desired. The increased ring/cylinder sealing depth permitted allows reduced ring force, hence reduced friction and reduced wear; and ring force reduced variation as a function of chamber pressure variations reduces uneven wear along the cylinder wall as higher ring forces on the cylinder wall about TDC cause increased wear about TDC. This should increase cylinder life. Additionally it should eliminate or greatly reduce ring "grabbing" (see FIG. 13-20 page 733 "Internal Combustion Engine Fundamentals", J. B. Heywood McGraw-Hill 1988) near TDC during the expansion stroke thereby improving the about TDC seal by not tending to lift the ring and not having the upper ring land impact the ring which should improve ring life.

Figure 1:
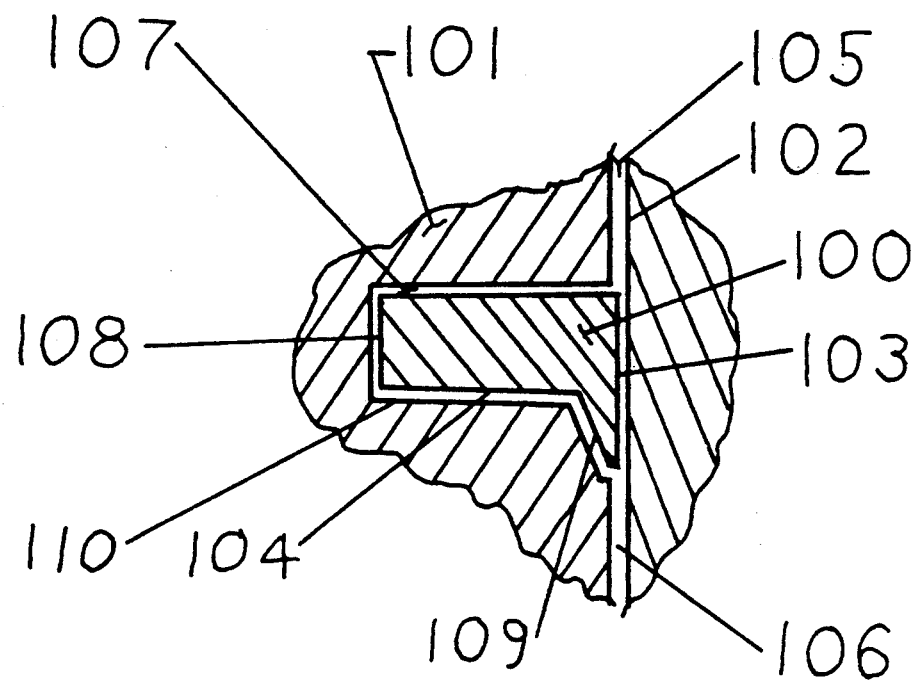
FIG. 1 is a sectional view of a pressure caused radial force balanced ring in a piston ring groove.
Figures 2, 3:
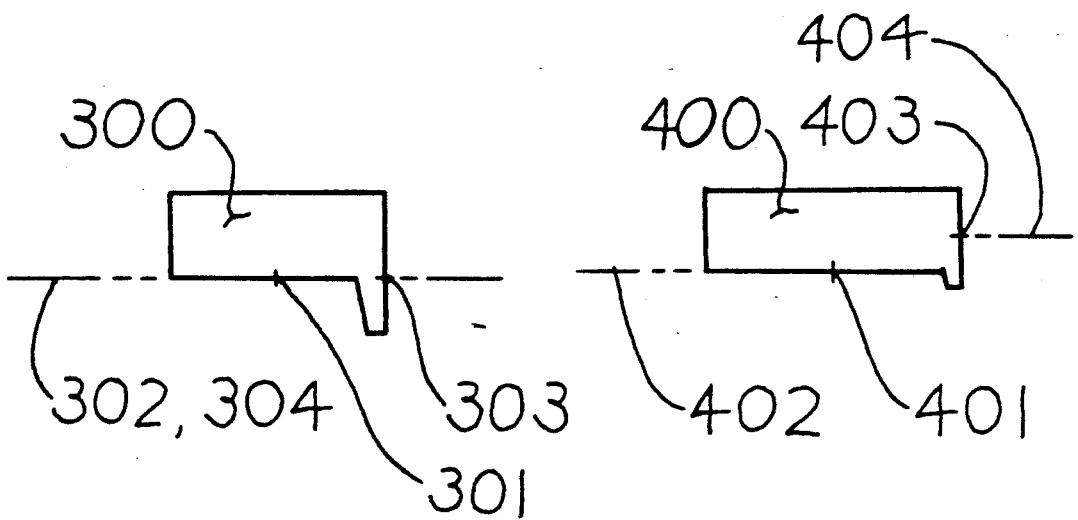
FIG. 2 shows the mid-pressure points and the planes formed of a FIG. 1 ring cross-section for a pressure balanced ring.
FIG. 3 shows the mid-pressure points and the planes formed of a FIG. 1 ring cross-section for a partially pressure balanced ring.

FIG. 2 shows the FIG. 1 ring cross-section 300 with the mid-pressure point 301 of the sealing surface between the ring and the ring groove bottom and the plane 302 formed through the mid pressure points around the ring sealing surface with the ring groove bottom surface. 303 is the mid-pressure point of the sealing surface between the ring and the cylinder wall and the plane 304 formed through the mid pressure points around the ring sealing surface with the cylinder wall. As mid-pressure point 301 and 303 are at the same axial depth in this figure the two planes are coincident.

FIG. 3 shows the FIG. 1 ring cross-section 400 with the mid-pressure point 401 of the sealing surface between the ring and the ring groove bottom and the plane 402 formed through the mid pressure points around the ring sealing surface with the ring groove bottom surface. 403 is the mid-pressure point of the sealing surface between the ring and the cylinder wall and the plane 404 formed through the mid pressure points around the ring sealing surface with the cylinder wall. Mid-pressure point 401 and 403 are not at the same axial depth in this figure.

Figures 4, 5:
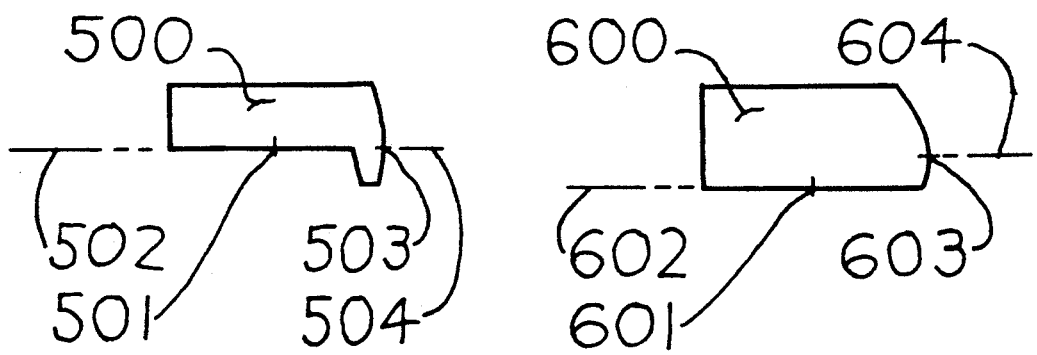
FIG. 4 shows the mid-pressure points and the planes formed of a barrel faced ring cross-section for a pressure balanced ring.
FIG. 5 shows the mid-pressure points and the planes formed of a barrel faced ring cross-section for a partially pressure balanced ring.

FIG. 4 shows a barrel faced ring cross-section 500 with the mid-pressure point 501 of the sealing surface between the ring and the ring groove bottom and the plane 502 formed through the mid pressure points around the ring sealing surface with the ring groove bottom surface. 503 is the mid-pressure point of the sealing surface between the ring and the cylinder wall and the plane 504 formed through the mid pressure points around the ring sealing surface with the cylinder wall. As mid-pressure point 501 and 503 are at the same axial depth in this figure the two planes are coincident.

FIG. 5 shows a barrel faced ring cross-section 600 with the mid-pressure point 601 of the sealing surface between the ring and the ring groove bottom and the plane 602 formed through the mid pressure points around the ring sealing surface with the ring groove bottom surface. 603 is the mid-pressure point of the sealing surface between the ring and the cylinder wall and the plane 604 formed through the mid pressure points around the ring sealing surface with the cylinder wall. Mid-pressure point 601 and 603 are not at the same axial depth in this figure.

I claim:

1. A piston ring for internal combustion engines, expanders and compressors for use with a piston, said piston having a ring groove, said ring groove having a bottom surface which is normal or approximately normal to the cylinder wall; and wherein said ring groove's bottom groove surface seals with said ring's bottom surface; and wherein said ring and cylinder wall sealing surface depth in the axial direction is equal to or greater than 10 percent of said ring's axial dimension; and wherein said ring is dimensioned to have a plane, hereafter referred to as plane 1, formed through the points around the surface of said ring sealing surface against the cylinder wall where said points are at a pressure approximately midway between the pressure above said ring and the pressure below said ring; and wherein a second plane, hereafter referred to as plane 2, formed through the points around the surface of said ring's sealing surface against the piston ring groove bottom surface where said points are at a pressure approximately midway between the pressure above said ring and the pressure below said ring and wherein said plane 2 is at or close to the same axial depth of said ring as said plane 1.

2. As stated in claim 1; wherein, said ring is dimensioned to have said plane 2 closer to the crankcase chamber than said plane 1; and wherein the separation of the two said planes is less than seven sixteenths said ring's axial depth.

3. A piston ring for internal combustion engines, expanders and compressors for use with a piston, said piston having a ring groove, said ring groove having a bottom surface which is normal or approximately normal to the cylinder wall; and wherein said bottom ring groove surface seals with said ring bottom surface; and wherein said ring is dimensioned to have a plane, here after referred to as plane 1, formed through the points around the surface of said ring sealing surface against the cylinder wall where said points are at a pressure approximately midway between the pressure above said ring and the pressure below said ring; and wherein a second plane, hereafter referred to as plane 2, formed through the points around the surface of said ring sealing surface against the piston ring groove bottom surface where said points are at a pressure approximately midway between the pressure above said ring and the pressure below said ring and said plane 2 is at or close to the same axial depth of said ring as said plane 1; and wherein said ring's surface facing said cylinder wall extend below, toward crankcase, said plane 2.

4. As stated in claim 3; wherein, said ring is dimensioned to have said plane 2 closer to the crankcase chamber than said plane 1; and wherein the separation of the two said planes is less than seven sixteenths said ring's axial depth.

5. A piston ring of "barrel-face" design for internal combustion engines, expanders and compressors for use with a piston, said piston having a ring groove, said ring groove having a bottom surface which is normal or approximately normal to the cylinder wall; and wherein said bottom ring groove surface seals with said ring bottom surface; and wherein said ring is dimensioned to have a plane, hereafter referred to as plane 1, formed through the points around the surface of said ring sealing surface against the cylinder wall where said points are at a pressure approximately midway between the pressure above said ring and the pressure below said ring; and wherein a second plane, hereafter referred to as plane 2, formed through the points around the surface of said ring sealing surface against the piston ring groove bottom surface where said points are at a pressure approximately midway between the pressure above said ring and the pressure below said ring mid-pressure points of said ring's sealing surface with the piston is at or approximately at the same axial depth of said ring as plane 1.

6. As stated in claim 5; wherein, said ring is dimensioned to have said plane 2 closer to the crankcase chamber than said plane 1; and wherein the separation of the two said planes is less than seven sixteenths said ring's axial depth.

* * * * *